United States Patent
Ljøsne

(10) Patent No.: US 12,491,967 B2
(45) Date of Patent: Dec. 9, 2025

(54) MULTIPLE MULTI-SPEED GEAR SYSTEMS AND GEAR CARTRIDGES WITH DIFFERENT GEAR RANGES AND METHOD FOR MANUFACTURING SUCH

(71) Applicant: MONT INVEST 30 AS, Oslo (NO)

(72) Inventor: Knut Tore Ljøsne, Lom (NO)

(73) Assignee: MONT INVEST 30 AS, Oslo (NO)

(*) Notice: Subject to any disclaimer, the term of this patent is extended or adjusted under 35 U.S.C. 154(b) by 0 days.

(21) Appl. No.: 18/687,009

(22) PCT Filed: Aug. 24, 2022

(86) PCT No.: PCT/NO2022/050202
§ 371 (c)(1),
(2) Date: Feb. 27, 2024

(87) PCT Pub. No.: WO2023/027592
PCT Pub. Date: Mar. 2, 2023

(65) Prior Publication Data
US 2024/0383573 A1    Nov. 21, 2024

(30) Foreign Application Priority Data
Aug. 27, 2021   (NO) .................................. 20211028

(51) Int. Cl.
*B62M 11/18*    (2006.01)
(52) U.S. Cl.
CPC .................................. *B62M 11/18* (2013.01)
(58) Field of Classification Search
CPC ..... F16H 2200/0056; F16H 2200/2007; F16H 2200/2046; F16H 3/66; B62M 11/18; B62M 11/145; F16D 13/00
See application file for complete search history.

(56) References Cited

U.S. PATENT DOCUMENTS

| | | | |
|---|---|---|---|
| 4,973,297 A | * | 11/1990 | Bergles .................. B62M 11/18 192/217.4 |
| 6,048,287 A | | 4/2000 | Rohloff |

(Continued)

FOREIGN PATENT DOCUMENTS

| | | |
|---|---|---|
| CN | 110843996 A | 2/2020 |
| DE | 19720796 A1 | 11/1998 |

(Continued)

OTHER PUBLICATIONS

International Search Report for PCT/NO2022/050202 dated Nov. 9, 2022, 3 pages.

(Continued)

*Primary Examiner* — Tisha D Lewis
(74) *Attorney, Agent, or Firm* — NIXON & VANDERHYE

(57) ABSTRACT

Multiple multi-speed gear systems or cartridges with different gear ranges, and method for manufacturing such, each include a main shaft, a first planetary gear set including a first sun gear, first planetary gears, and a first ring gear, a second planetary gear set interconnected with the first planetary gear set, including a second sun gear arranged rotationally fixed to the main shaft, second planetary gears, and a second ring gear, first, second and third carriers, first and second clutch sets, wherein the multiple pedally propelled vehicle multi-speed gear systems comprises first and second gear systems with different gear ranges, wherein the teeth ratio between the first sun gear and the first ring gear is identical in the first and second gear systems and the second ring gears are identical in the first and second gear systems.

12 Claims, 8 Drawing Sheets

(56) References Cited

U.S. PATENT DOCUMENTS

| | | | | |
|---|---|---|---|---|
| 8,449,427 B2 * | 5/2013 | Witonis | ............... | B62M 11/145 |
| | | | | 475/269 |
| 8,900,087 B2 * | 12/2014 | Ward | ..................... | B62M 11/18 |
| | | | | 475/330 |
| 9,279,480 B2 | 3/2016 | Antal et al. | | |
| 9,884,666 B2 * | 2/2018 | Starik | ................... | B62M 11/16 |
| 2007/0275811 A1 | 11/2007 | Starik | | |
| 2010/0248890 A1* | 9/2010 | Baldwin | .................. | F16H 3/66 |
| | | | | 475/275 |
| 2015/0141196 A1 | 5/2015 | Yoo | | |
| 2017/0217538 A1 | 8/2017 | Yamamoto | | |
| 2021/0107595 A1 | 4/2021 | Donner | | |

FOREIGN PATENT DOCUMENTS

| | | | |
|---|---|---|---|
| EP | 1571077 A2 | 9/2005 | |
| NO | 345740 B1 | 6/2020 | |
| TW | 201418600 A | 5/2014 | |
| WO | 2019192634 A1 | 10/2019 | |
| WO | 2019228723 A1 | 12/2019 | |
| WO | 2019228724 A1 | 12/2019 | |
| WO | WO-2020052434 A1 * | 3/2020 | ............ B62M 11/16 |
| WO | 2020130841 A1 | 6/2020 | |

OTHER PUBLICATIONS

Written Opinion of the ISA for PCT/NO2022/050202 dated Nov. 9, 2022, 6 pages.

Search Report, issued in Norwegian Patent Application No. 20211028 dated Jan. 28, 2022.

* cited by examiner

MULTIPLE MULTI-SPEED GEAR SYSTEMS AND GEAR CARTRIDGES WITH DIFFERENT GEAR RANGES AND METHOD FOR MANUFACTURING SUCH

CROSS-REFERENCE TO RELATED APPLICATIONS

This application is the U.S. national phase of International Application No. PCT/NO2022/050202 filed Aug. 24, 2022 which designated the U.S. and claims priority to NO 20211028 filed Aug. 27, 2021, the entire contents of each of which are hereby incorporated by reference.

TECHNICAL FIELD

The present invention relates to planetary internal gear mechanisms for pedally propelled vehicles.

BACKGROUND

Internal gear mechanisms for pedally vehicles are experiencing resurgence in popularity due to their robustness, long service life, and recent technological improvements. When external gears, which are exposed and prone to impacts, deteriorate quickly, and require frequent maintenance, are shifted, the chain bends sideways and its bushings wear and stretch which causes cogs and chain rings to wear prematurely.

Internal gears are in this sense more optimal, but typical multispeed ones cannot handle the high torque of rider and assist motor. Most internal gears are shifted solely by means of pawls, such as in and EP1571077 A2, or as in the case of e.g. DE19720796, with both pawls and axial clutches, although U.S. Pat. No. 9,279,480 offers improvement on many levels. Further optimization is desirable, to simplify, reduce cost, and improve function.

Some of the structural challenges involved in allowing higher torque have been addressed in WO2020130841A1, but issues related to compactness of the design and processing, manufacturing and logistics e.g. to reduce costs and to improve useability remain to be solved.

The pedaling rate is defined as the number of revolutions of the crank shaft per unit time. This is also termed the cadence and is mostly defined as rounds per minute (rpm).

Although an optimal cadence is unique for every rider, it depends on the activity how important it is to maintain the specific cadence over time. E.g., a commuter may want to stay as much as possible close to the optimal cadence, and the intervals between the gears is therefore more important than the total gear range. For mountain biking the situation is the opposite. Since there are constant changes, a large range between the lower and upper gears is more important than small intervals.

SHORT SUMMARY

A goal with the present invention is to improve availability of multi-speed gear systems for different user groups and different applications.

More specifically, different multi-speed systems with the same number of gears but with different intervals between the gears and corresponding different gear ranges can be manufactured from a number of shared components, where only a limited set of components are specific for each gear range. Manufacturing may here be related to the manufacturing process comprising product design and engineering.

This may reduce production costs and improve quality, since even the series with the least numbers of units can benefit from mass produced components in the more popular series.

Further, each of the multi speed gears with different gear ranges may be made more compact, easier to process and manufacture and easier to handle logistically than prior art. This will contribute to reduced lifetime costs and potentially contribute to more environmentally friendly transport. The multi-speed gear system according to the invention may be used both for manually-only operated pedally propelled vehicles, as well as motor assisted vehicles.

The invention even allows for replacement of a gear system with a given gear range with another gear system with a different gear range if the rider was not satisfied with the first gear range or intervals. The same housing may be re-used, which can reduce the time required to complete the change compared to the situation where a new gear housing of a different type would have to be arranged to the vehicle.

The invention is in an aspect, multiple multi speed gear systems with different gear ranges, multiple multi speed gear cartridges with different gear ranges and a method for producing such gear systems or gear cartridges according to the independent claims.

BRIEF DESCRIPTION OF THE DRAWINGS

FIG. 10 illustrates in a perspective view the same indexing system and shift axle (200) as in FIG. 9, partly arranged inside a main shaft (5) of a multi-speed gear system that may be one of multiple gear systems.

FIG. 11 illustrates the same indexing system and shift axle (200) as in FIG. 10, but without the main shaft and in a different perspective view. The shift axle in this case has first and second shift cams (211, 212) and a shift actuator interface (260) in an end in the direction (D) in the form of a spline coupling. The shift cams will operate on one shift balls radially through one or more through holes (313, 413) seen in FIG. 9.

EMBODIMENTS OF THE INVENTION

Figure 1:
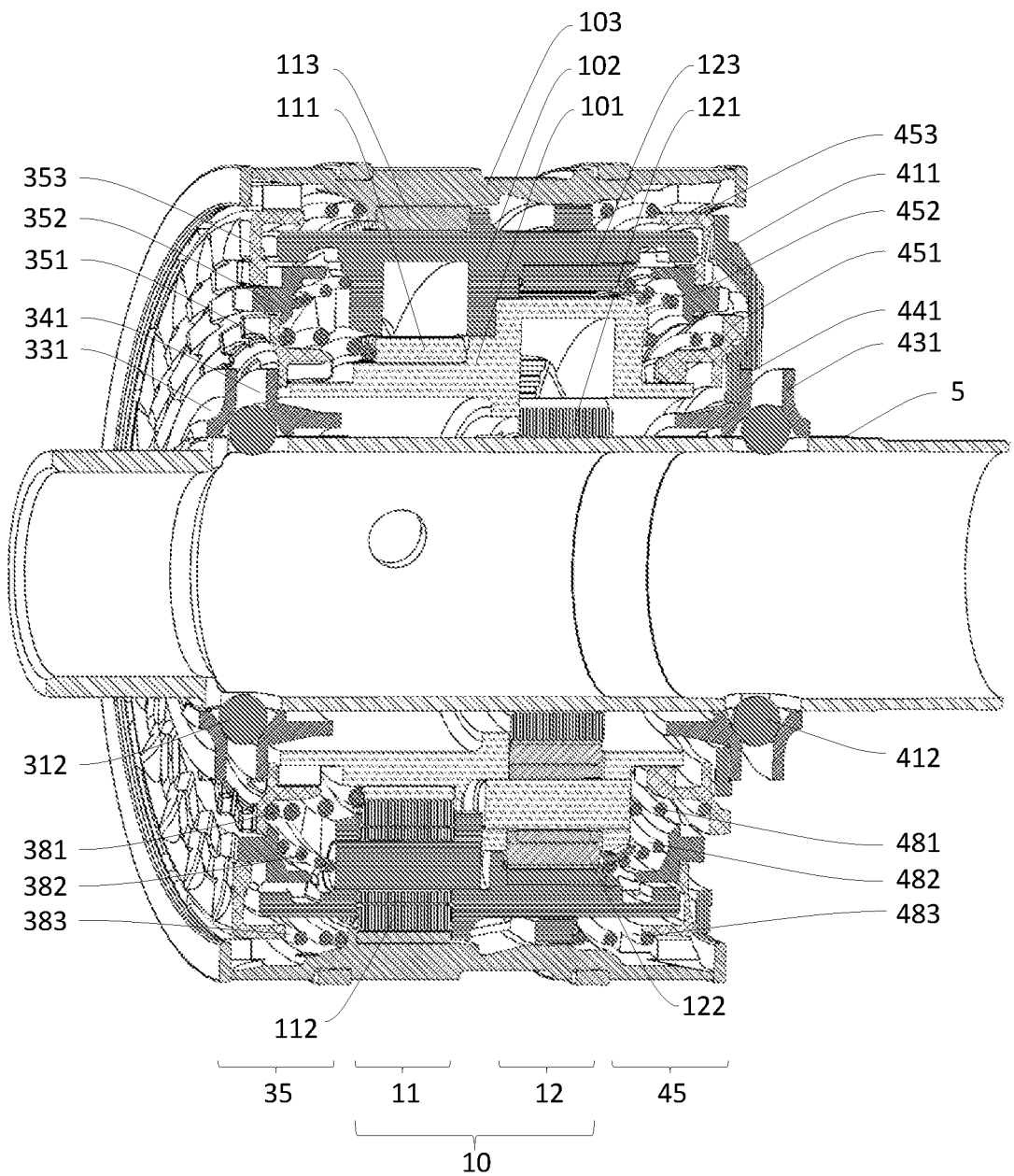
FIG. 1 illustrates in a perspective section view some of the elements of a multi-speed gear system (1) that may be one of multiple gear systems according to an embodiment of the invention.

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

The embodiments described below are numbered. In addition, dependent embodiments defined in relation to the numbered embodiments are described. Unless otherwise specified, any embodiment that can be combined with one or more numbered embodiments may also be combined directly with any of the dependent embodiments of the numbered embodiment(s) referred to.

In a first embodiment ES1, the invention is multiple multi-speed gear systems (1) with different gear ranges, wherein each of the gear systems (1) comprises;

a main shaft (5), a planetary gear section (10) comprising;

a first planetary gear set (11) comprising a first sun gear (111), first planetary gears (112), and a first ring gear (113), a second planetary gear set (12) interconnected with the first planetary gear set, comprising a second sun gear (121) arranged rotationally fixed to the main shaft (5), second planetary gears (122), and a second ring gear (123), a first carrier (101) holding the second planetary gears (122) and the first sun gear (111), a second carrier (102) holding the first planetary gears (112) and the second ring gear (123), an outer carrier (103) holding the first ring gear (113) and first and second clutch sets (35, 45) arranged on respective sides of the planetary gear section (10), wherein the multiple pedally propelled vehicle multi-speed gear systems (1) comprises first and second gear systems (1a, 1b) with different gear ranges, wherein the teeth ratio between the first sun gear (111) and the first ring gear (113) is identical in the first and second gear systems and the second ring gears (123) are identical in the first and second gear systems.

In a first dependent embodiment, the teeth ratio between the first sun gear (111) and the first ring gear (113) is 0.70+/−0.10, which encompasses a range of 0.60-0.80, in the first and second gear systems.

In a second dependent embodiment, that may be combined with the first dependent embodiment, the teeth ratio between the second sun gear (121) and the second ring gear (123) is 0.63+/−0.10, which encompasses a range of 0.53-0.73, in the first gear systems and 0.55+/−0.10, which encompasses a range of 0.45-0.65, in the second gear system.

In a second embodiment ES2, that may be combined with ES1, the multiple pedally propelled vehicle multi-speed gear systems (1) comprises a third gear system (1c) with a gear range different from the gear ranges of the first and second gear systems, wherein the first ring gear (113) in the third gear system is identical to the first ring gear (113) in the first and second gear systems.

In a first dependent embodiment, the teeth ratio between the first sun gear (111) and the first ring gear (113) is 0.67+/−0.10, which encompasses a range of 0.57-0.77, in the third gear system.

In a second dependent embodiment, that may be combined with the first dependent embodiment, the teeth ratio between the second sun gear (121) and the second ring gear (123) is 0.48+/−0.10, which encompasses a range of 0.38-0.58, in the third gear system.

In a third embodiment ES3, that may be combined with ES1 or ES2, the first ring gears (113) and the second ring gears (123) are identical for first and second gear systems.

In a first dependent embodiment, the first sun gears (111) are identical for the first and second gear systems.

In a second dependent embodiment, that may be combined with the first dependent embodiment, the first planet gears (112) are identical for the first and second gear systems.

In a third dependent embodiment, that may be combined with the first or second dependent embodiment, wherein the second carriers (102) are identical for the first and second gear systems.

In a first dependent embodiment, the teeth ratio between the first sun gear (111) and the first ring gear (113) is 0.70+/−0.10, which encompasses a range of 0.60-0.80, in the first and second gear systems.

In a fifth embodiment ES5, that may be combined with any of ES1 to ES4, the outer rings (103), and the main shaft (5) of any of the first, second or third gear systems are identical.

In a sixth embodiment ES6, that may be combined with any of ES1 to ES5, wherein
  the first clutch set (35) comprises a first outward clutch element (71) and radially stacked, axially movable first inner, middle and outer clutch elements (351, 352, 353),
  the second clutch set (45) comprises a second outward clutch element (72) and radially stacked, axially movable second inner, middle and outer clutch elements (451, 452, 453), and wherein the first and second inner clutch elements (351, 451) of any of the first, second or third gear systems are identical and symmetrically arranged about the planetary gear section (10).

In a second dependent embodiment, that may be combined with the first dependent embodiment, the first and second middle clutch elements (352, 452) of any of the first, second or third gear systems are identical and symmetrically arranged about the planetary gear section (10).

In a third dependent embodiment, that may be combined with the first or second dependent embodiment, the first and second outer clutch elements (353, 453) of any of the first, second or third gear systems are identical and symmetrically arranged about the planetary gear section (10).

In a fourth dependent embodiment, that may be combined with any of the dependent embodiments above, the first or second dependent embodiment, wherein a first end (101a) of the first carrier (101) is releasably connected to the first inner clutch element (351) and a second end (101b), opposite the first end is releasably connected to the second inner clutch element (451), wherein the first sun gear (111) is arranged rotationally fixed to the first carrier (101) between the first end (101a) and the second planetary gears (122), wherein an inner diameter of the first sun gear (111) is larger than an outer diameter of the first end (101a) for any of the first, second or third gear systems.

In a fifth dependent embodiment, that may be combined with any of the dependent embodiments above, an inner diameter of the second end (101b) is larger than an outer diameter of the second sun gear (121) for any of the first, second or third gear systems.

In a sixth dependent embodiment, that may be combined with any of the dependent embodiments above, that may be combined with the first dependent embodiment, wherein the first end (102a) of the second carrier is releasably connected to the first middle clutch element (352) and a second end (102b), opposite the first end is releasably connected to the second middle clutch element (452), wherein the second ring gear (123) is arranged rotationally fixed to the second carrier (102) between the second end (102b) and the second planetary gears (122), wherein an inner diameter of the second end (102b) is larger than an outer diameter of the second ring gear (123) for any of the first, second or third gear systems.

In a seventh dependent embodiment, that may be combined with any of the dependent embodiments above, the planetary gear section (10) further comprises;
  an outer ring (103), wherein a first end (103a) is releasably connected to the first outer clutch element (353) and a second end (103b), opposite the first end is releasably connected to the second outer clutch element (453), wherein the first ring gear (113) is arranged rotationally fixed to the outer ring (103) between the first end and the second planetary gear set (12), and wherein the first end (102a) of the second carrier (102) is smaller than the inner diameter of the first ring gear (113) for any of the first, second or third gear systems.

In an embodiment ES7, that may be combined with any of ES1 to ES6, the second sun gear (121) is configured to be slidingly arranged on the main shaft (5) and axially supported by the support protrusion (131) in a direction (D) for any of the first, second or third gear systems.

In a first dependent embodiment, the first carrier is configured to be slidingly arranged on the main shaft in the axial direction (D) until it is axially supported by the second sun gear (121) for any of the first, second or third gear systems.

In a second dependent embodiment, that may be combined with the first dependent embodiment, the second carrier is configured to be slidingly arranged on the main shaft in the axial direction (D) until it is axially supported by the first carrier (101) for any of the first, second or third gear systems.

In a third dependent embodiment, that may be combined with the second dependent embodiment, the outer ring (103) is configured to be slidingly arranged on the main shaft in the axial direction (D) until the first ring gear (113) is axially supported by the second carrier (102) for any of the first, second or third gear systems.

In a fourth dependent embodiment, that may be combined with the third dependent embodiment, any of the multi-speed gear systems (1) comprises a first thrust ring (134) configured to be slidingly arranged on the main shaft in the axial direction (D) until it is axially supported by outer ring (103) for any of the first, second or third gear systems.

In a fifth dependent embodiment, that may be combined with the fourth dependent embodiment, any of the multi-speed gear systems (1) comprises a first housing (170) configured to be slidingly arranged on the main shaft in the axial direction (D) until it is axially supported by first thrust ring (134) for any of the first, second or third gear systems.

Figure 6:
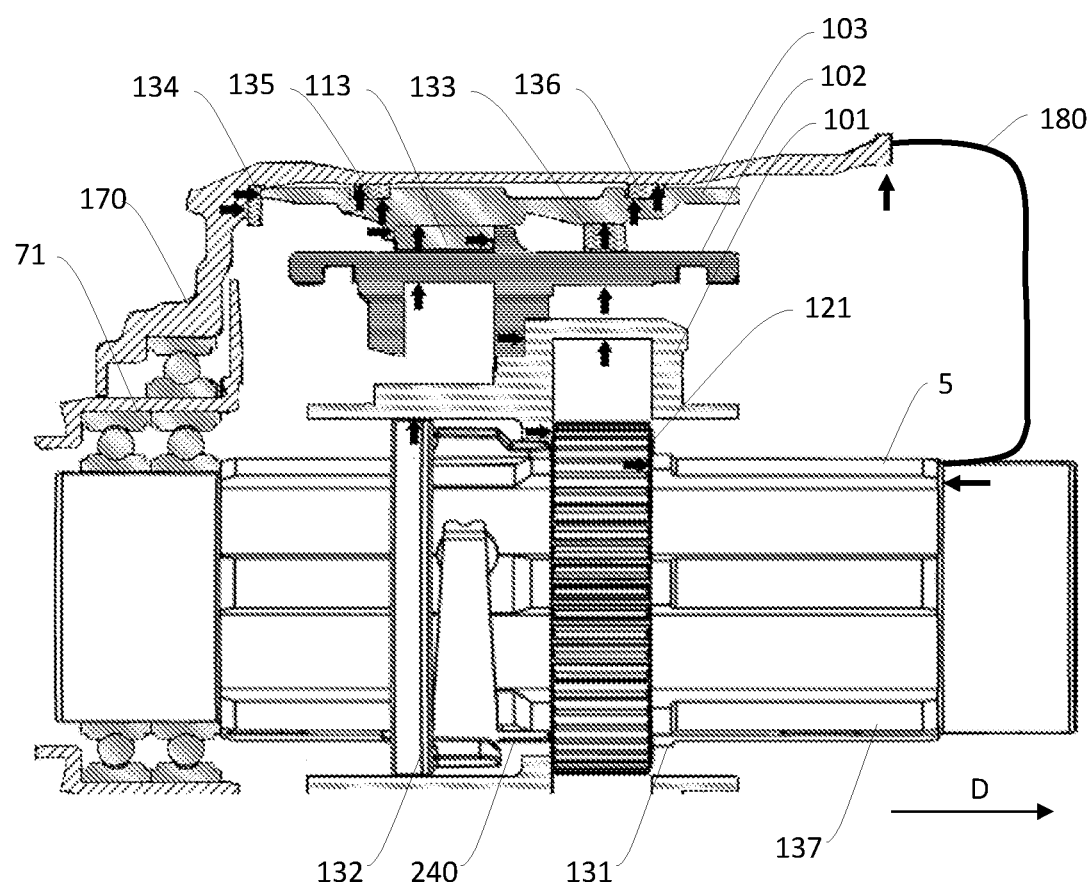
FIG. 6 is a combined section view, side view and diagrammatic view of some of the elements of a multi-speed gear system (1) that may be one of multiple gear systems. More specifically it illustrates with vertical and horizontal arrows some radially and axially interacting surfaces, respectively. This allows full alignment without the needs for adding shims etc., during assembly. The second and outer rings (103) is radially supported by the middle support ring (133), and the outer ring is radially supported by first and second axially spaced outer support rings (135, 136) arranged between the housing and the outer ring (103).
Figure 7:
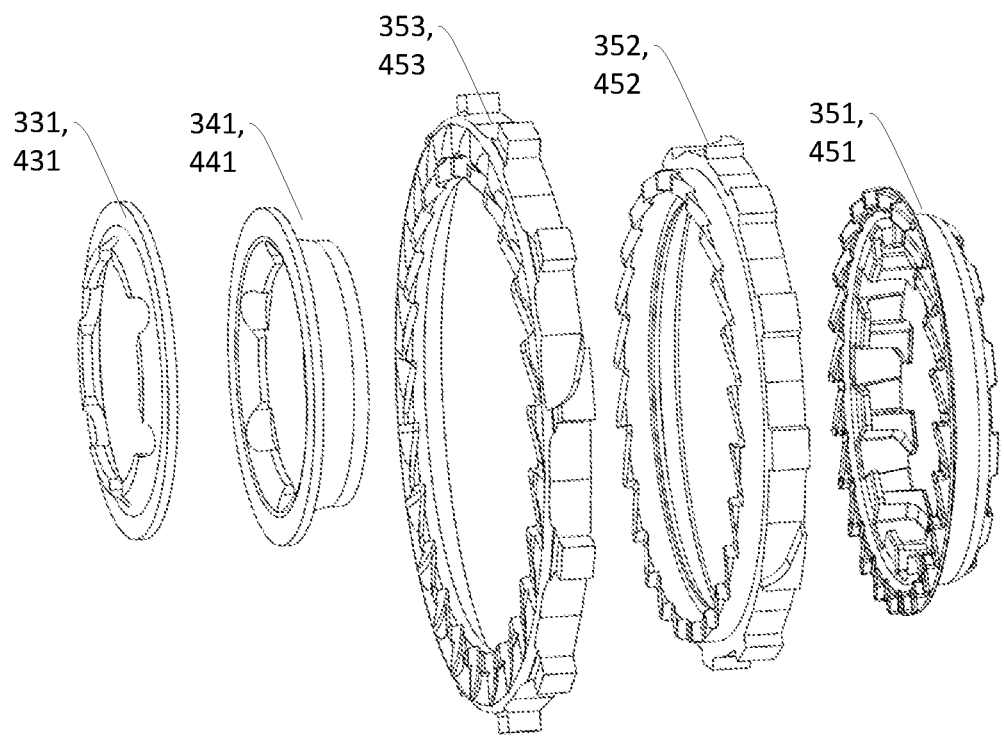
FIG. 7 illustrates in an embodiment and in perspective views, that first inner, middle and outer clutch elements (351, 352, 353) of a multi-speed gear system (1) that may be one of multiple gear systems are identical to the second inner, middle and outer clutch elements (451, 452, 453).
Figure 8:
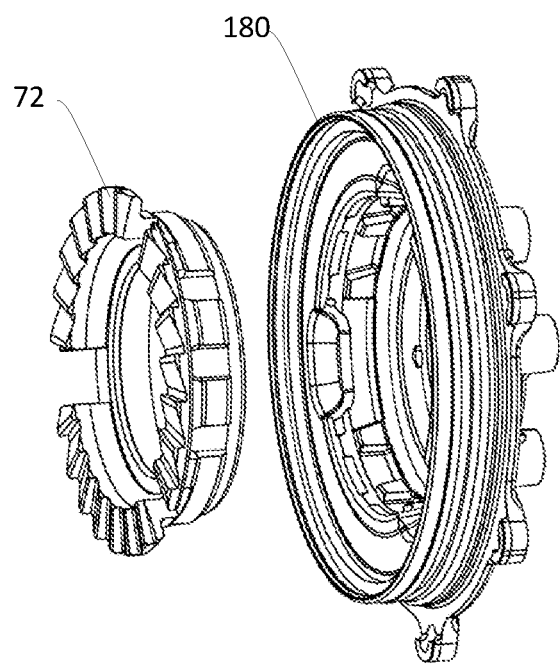
FIG. 8 illustrates in an exploded perspective view the interaction between the second outward clutch element (72) and the housing cover (180). Dogs (180a) and recesses in the housing cover match corresponding dogs and recesses in the second outward clutch element (72). Further, the second outward clutch element (72) is radially and axially locked in the direction (D) by the housing cover (180).
Figure 9:
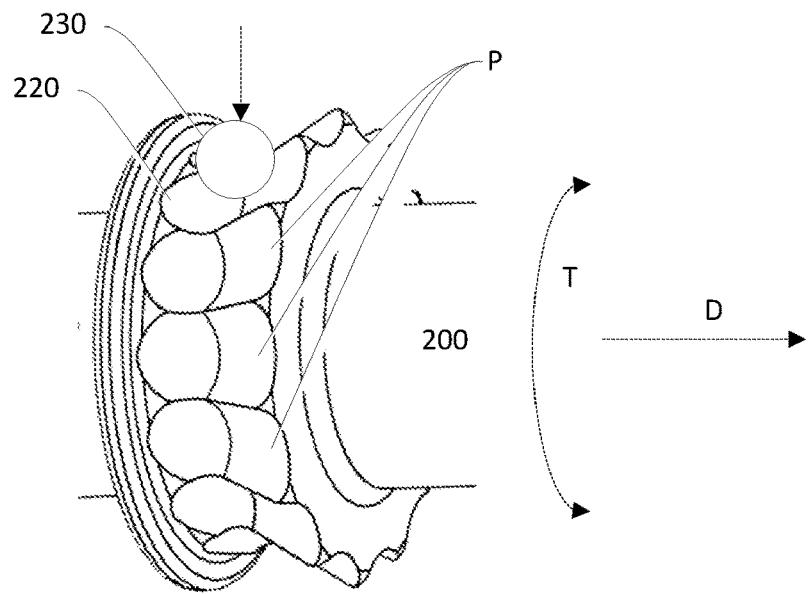
FIG. 9 illustrates in a perspective view a detail of the indexing system according to an embodiment of the invention. The first indexing means (220), here illustrated as grooves are rotationally fixed with respect to the shift axle (200). The second indexing means (230), here illustrated as ball(s), are rotationally fixed with respect to the multi-speed gear system. Resilient means (240) illustrated e.g.
Figure 10:
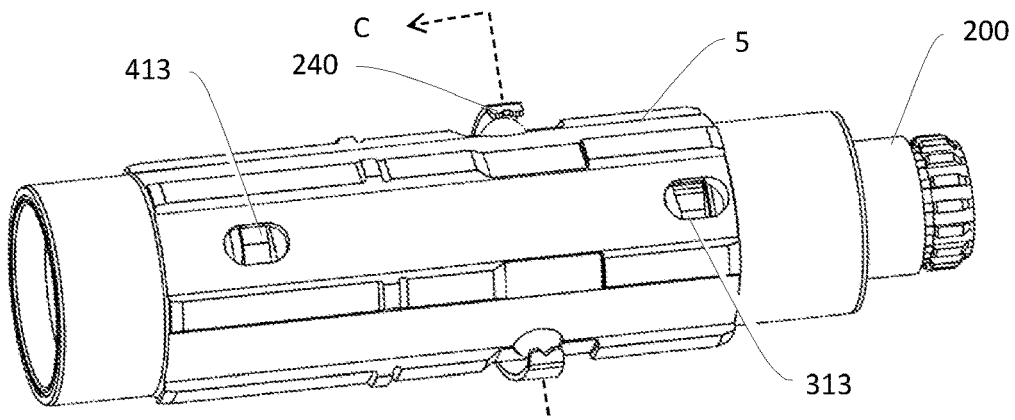
in FIG. 10 and FIG. 11 will push the first and second indexing means together. The push force (F) from the resilient means is illustrated with an arrow. When the ball is pushed into a groove, it will act tangentially on the walls of the groove to provide a torque (T) that will force the shift axle (200) to rotate until the ball reaches the bottom of the groove where there is a torque balance, and the shift axle is in an indexed position (P). Further, the grooves are inclined in the axial direction and the push force (F) from the resilient means will result in a continuous axial force acting on the shift axle in the direction (D). This will improve sealing of the end of the rotating shift axle towards an abutting element.
Figure 11:
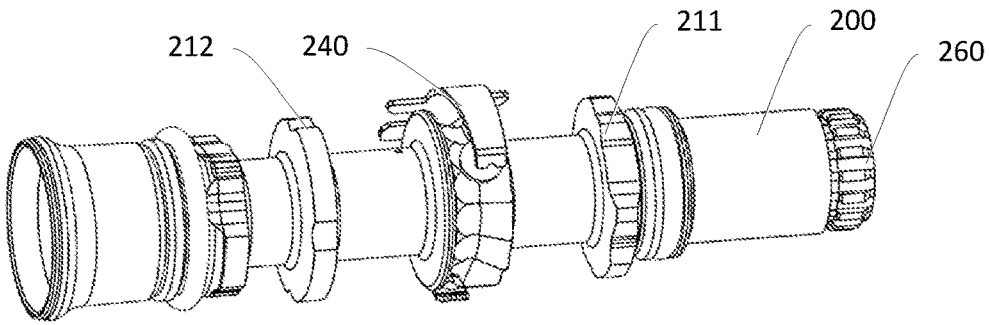
Figure 12:
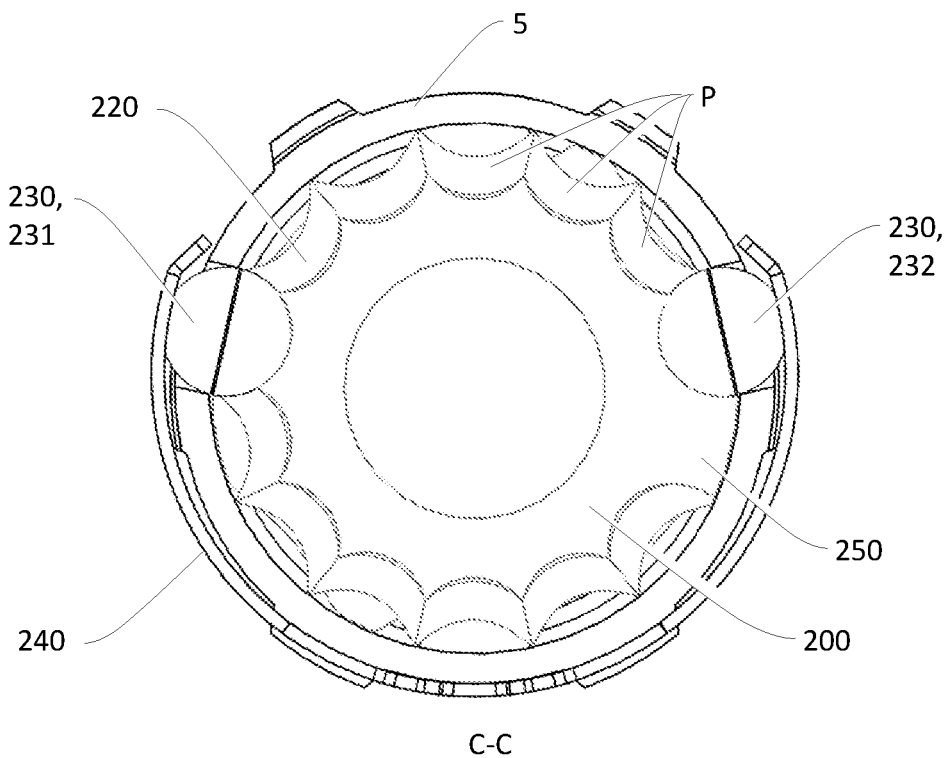
FIG. 12 illustrates in a cross-section C-C the indexing system illustrated in FIG. 11. The second indexing means (230) here comprises first and second indexing elements (231, 232), both pressed radially inwards by the resilient means (240). The shift axle is here in an end indexed position (P), since the second indexing means (232) abuts the end stop (250) on a first side.
Figure 13:
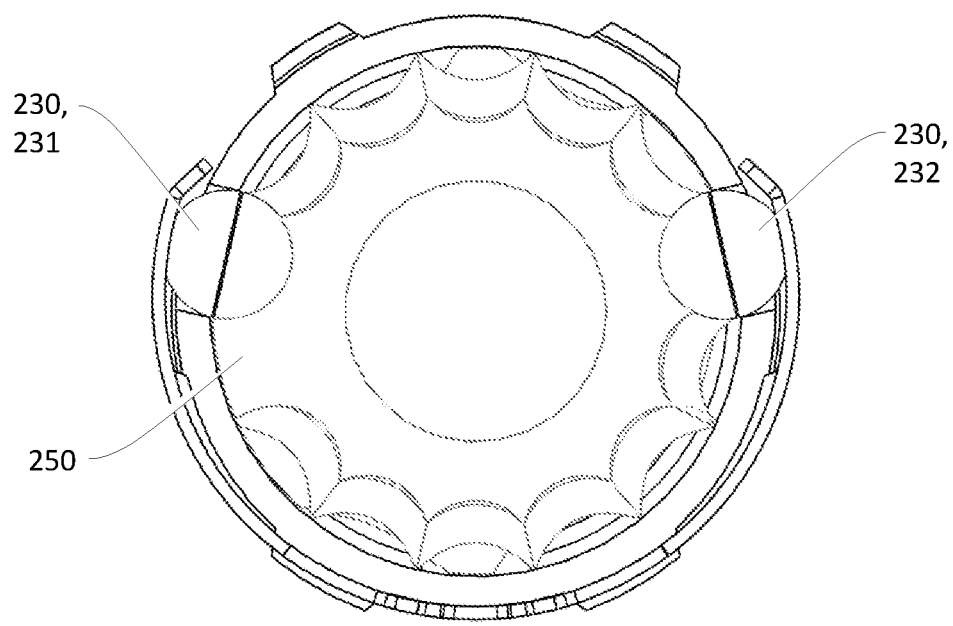
FIG. 13 illustrates the same cross-section as in FIG. 12, where the shift axle has been turned around clockwise until a second side of the end stop, opposite the first side, abuts the first indexing means (231). The indexing means illustrated here comprises seven available indexing positions and could typically be used to for indexing shifting of a multi-speed gear system with seven unique gear ratios.

In a sixth dependent embodiment, that may be combined with the fifth dependent embodiment, any of the multi-speed gear systems (1) comprises a housing cover (180) configured to be slidingly arranged on the main shaft (5) in a direction opposite the axial direction (D), and to force the main shaft opposite the axial direction (D). Further, the housing cover (180) is configured to rotate relative to the main shaft (5). In FIG. 6 the aggregation of the housing cover (180) and a bearing has been indicated as a line to simplify presentation. In the opposite end of the main shaft (5), the first housing is axially locked to the main shaft by ball bearings as illustrated, wherein the first outward clutch element (71) is arranged between the main shaft (5) and the first housing (170), and axially fixed in the direction (D) for any of the first, second or third gear systems.

When the housing cover is in place all internal parts of the gear are axially locked in both directions.

Some of the interfaces with axial support are indicated with horizontal arrows. Some of the interfaces are rotational, while others are fixed.

In a seventh dependent embodiment, that may be combined with any of the first to sixth dependent embodiments, the first thrust ring (134) may comprise plastic material for any of the first, second or third gear systems.

In a first method embodiment EM1, the invention is method for manufacturing multiple multi-speed gear systems (1) with different gear ranges, comprising manufacturing for first and second gear systems (1a, 1b) with different gear ranges;
- a main shaft (5),
- a planetary gear section (10) comprising;
- a first planetary gear set (11) comprising a first sun gear (111), first planetary gears (112), and a first ring gear (113),
- a second planetary gear set (12) configured to be interconnected with the first planetary gear set, wherein the second planetary gear set (12) comprises a second sun gear (121) configured to be arranged rotationally fixed to the main shaft (5), a second planetary gears (122), and a second ring gear (123),
- a first carrier (101) configured to hold the second planetary gears (122) and the first sun gear (111),
- a second carrier (102) configured to hold the first planetary gears (112) and the second ring gear (123),
- an outer carrier (103) configured to hold the first ring gear (113) and
- first and second clutch sets (35, 45) configured to be arranged on respective sides of the planetary gear section (10), wherein
- the teeth ratio between the first sun gear (111) and the first ring gear (113) is identical in the first and second gear systems and the second ring gears (123) are identical in the first and second gear systems.

In a first dependent embodiment, the teeth ratio between the first sun gear (111) and the first ring gear (113) is 0.70+/−0.10 in the first and second gear systems.

In a second dependent embodiment, that may be combined with the first dependent embodiment, the teeth ratio between the second sun gear (111) and the second ring gear (113) is 0.63+/−0.10, which encompasses a range of 0.53-0.73, in the first gear systems and 0.55+/−0.10, which encompasses a range of 0.45-0.65, in the second gear system.

In a second method embodiment EM2, that may be combined with EM1, the method comprises manufacturing a third gear system (1c) with a gear range different from the gear ranges of the first and second gear systems, wherein the first ring gear (113) in the third gear system is identical to the first ring gear (113) in the first and second gear systems.

In a first dependent embodiment, the teeth ratio between the first sun gear (111) and the first ring gear (113) is 0.67+/−0.10, which encompasses a range of 0.57-0.77, in the third gear system.

In a second dependent embodiment, that may be combined with the first dependent embodiment, the teeth ratio between the second sun gear (121) and the second ring gear (123) is 0.48+/−0.10, which encompasses a range of 0.38-0.58, in the third gear system.

In a third method embodiment EM3, any of the first, second or third gear system of EM1 or EM2 may be combined with any of the embodiments ES3 to ES7.

In an independent embodiment EC1, that may be combined with any of the embodiments ES1 to ES7 and EM1 to EM3, the multiple multi-speed gear systems (1) are multiple gear cartridges (15) configured to be arranged inside a housing.

In a first dependent embodiment, the external dimensions and design of a first gear cartridge with a first gear range of the multiple gear cartridges, are identical to the external dimensions and design of a second gear cartridge with a first gear range of the multiple gear cartridges.

In a second dependent embodiment that may be combined with the first dependent embodiment, any of the first, second and third gear systems in ES1 to ES7 corresponds to first, second and third gear cartridges, respectively.

Figure 2:
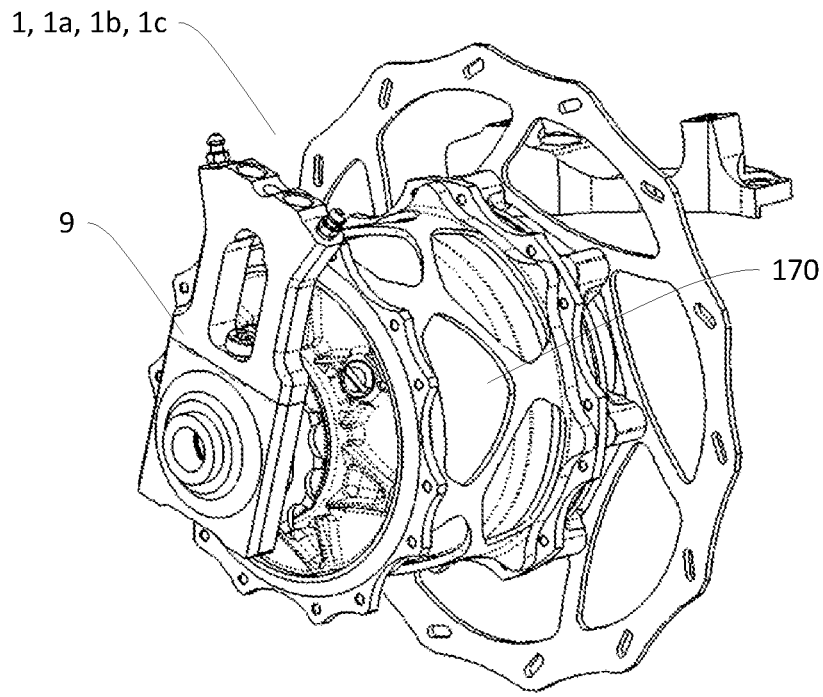
FIG. 2 illustrates in a perspective view a multi-speed gear system (1) with a gear shift actuator (9) that may be one of multiple gear systems according to an embodiment of the invention.
Figure 3A:
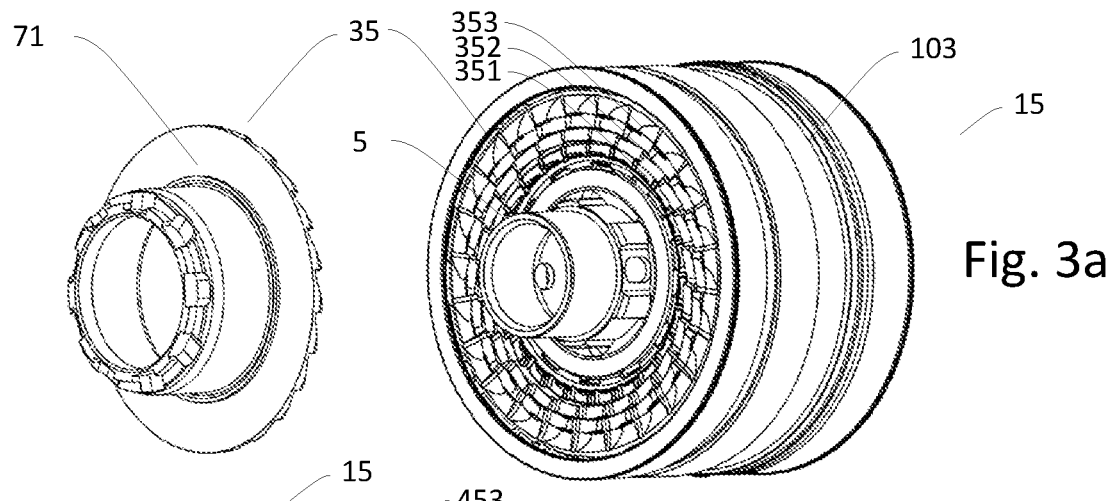
FIGS. 3a and 3b Illustrate in different perspective views, some elements of a multi-speed gear system (1) that may be one of multiple gear systems, wherein the outer ring (103) comprises a planetary gear section (hidden) and first and second clutch sets (35, 45) arranged on opposite sides of the gear section. A first outward clutch element (71) may be the driving element and connected to e.g., a cog wheel. A second outward clutch element (72) may be the driven element and is in this embodiment driving the first housing (170), seen in FIG. 1. The main shaft (5) may be rotationally fixed to a frame of a vehicle.
Figure 3B:
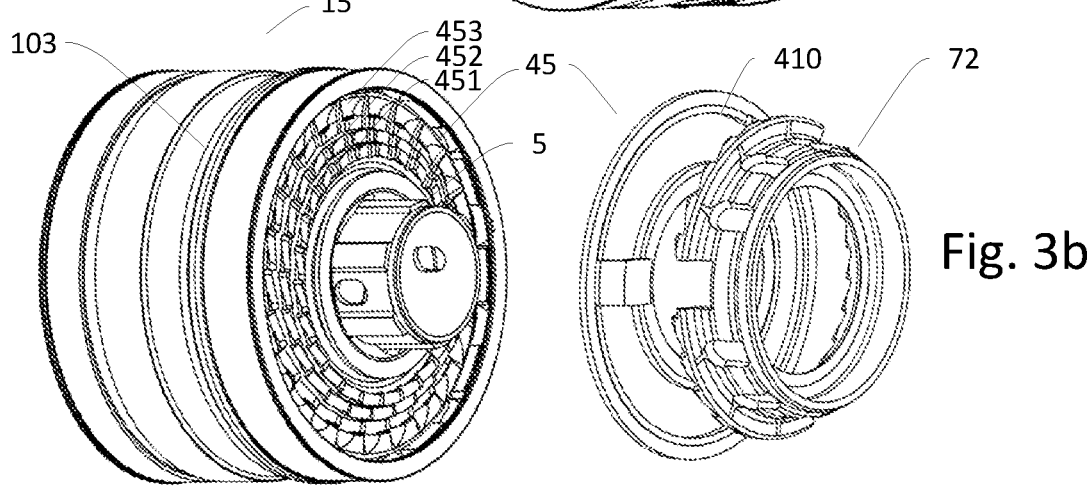
Figure 4:
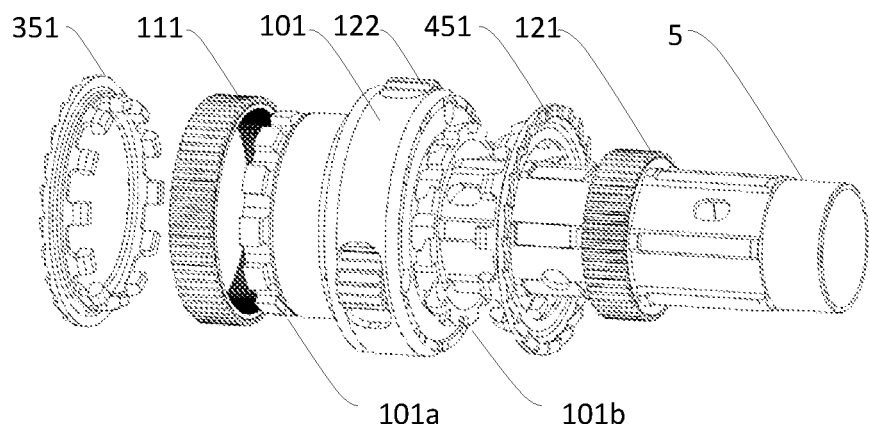
FIG. 4 is an exploded perspective view of some inner elements of an embodiment of a multi-speed gear system (1) that may be one of multiple gear systems. As can be seen the elements shown can be assembled axially in a specific order.
Figure 5:
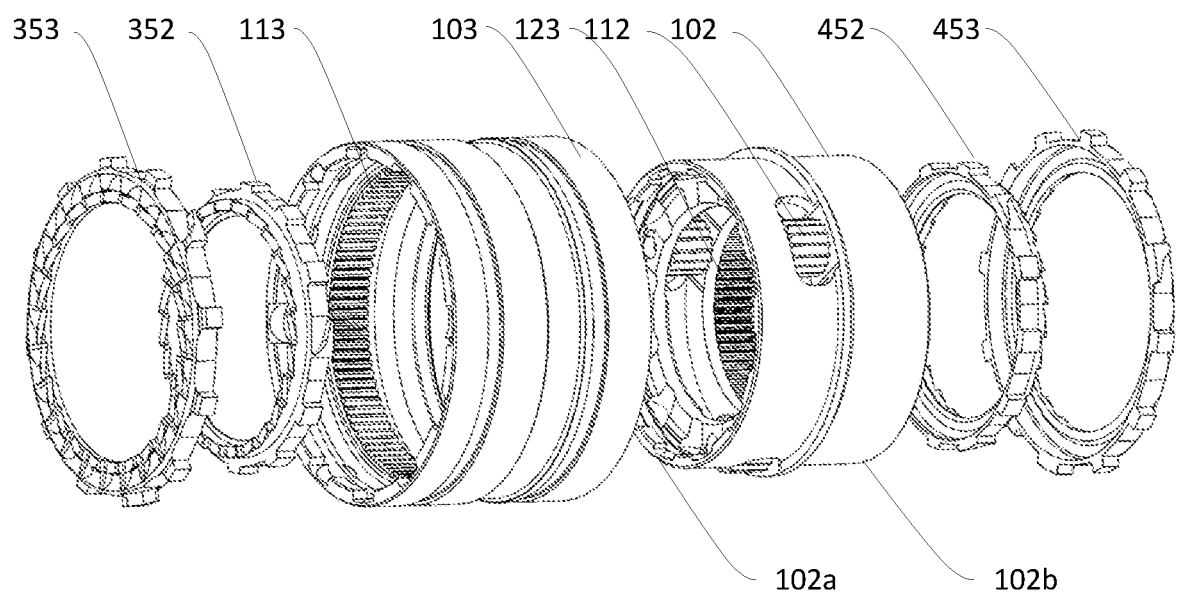
FIG. 5 is an exploded view of some of the middle and outer elements of an embodiment of a multi-speed gear system (1) that may be one of multiple gear systems. As can be seen the elements shown can be assembled axially in a specific order and combined with the inner elements in FIG. 4 to make up the cartridge shown in FIG. 4.
Figure 14A:
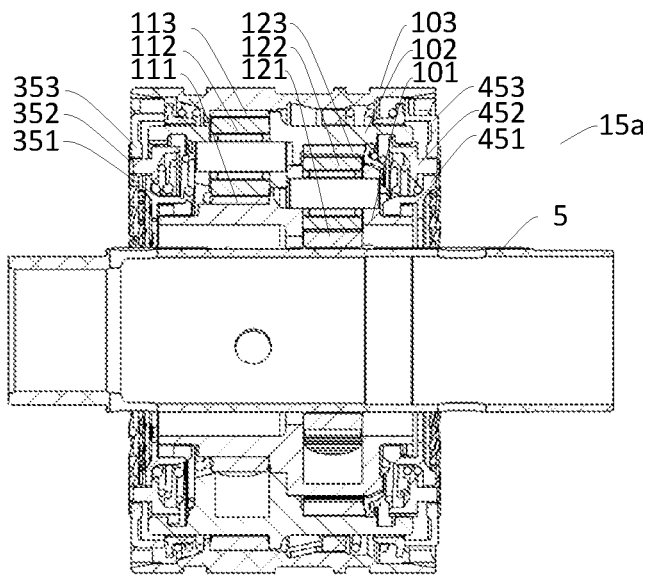
FIGS. 14a, 14b and 14c illustrate multi-speed gear cartridges (15a, 15b and 15c) with different gear ranges and gear intervals. Some elements found elsewhere in the drawings, e.g., related to the gear shift function, have been left out to simplify presentation.
Figure 14B:
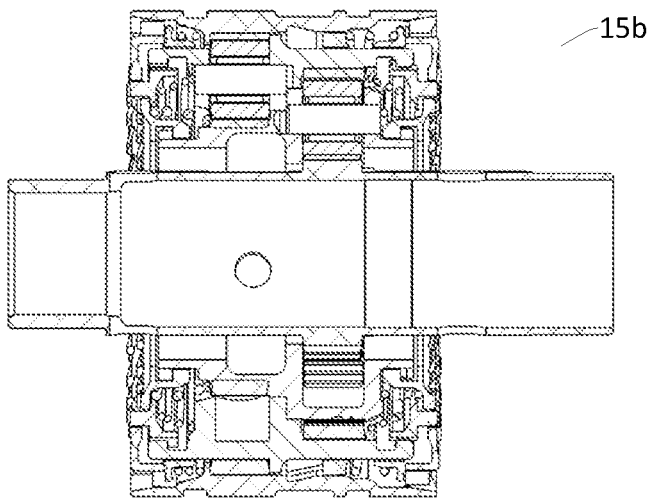
Figure 14C:
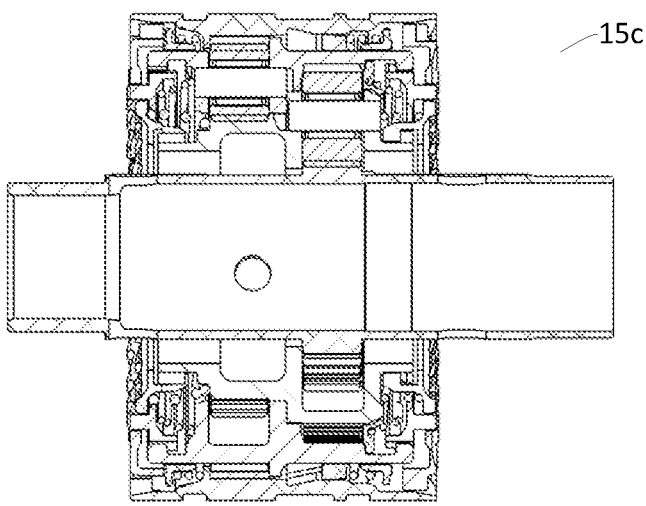

In a specific embodiment illustrated by the accompanying drawings, the invention is three pedally propelled vehicle multi-speed gear systems (1) with three different gear ranges. Each of the gear systems may from the outside look similar, with a first housing (170) such as e.g., illustrated in FIG. 2, and comprises a gear cartridge (15), such as the one illustrated in FIGS. 3a and 3b with different gear ranges, such as e.g. 428%, 377% and 325%, where the corresponding intervals are 27%, 24% and 21%. Thus, depending on the specific application, the multi-speed gear systems (1) may be provided with different gear ranges. Illustrations of the specific cartridges can be found in FIGS. 14a, 14b and 14c for the gear ranges 428%, 377% and 325%, respectively. The references have only been indicated for FIG. 14a, but they are identical for FIGS. 14b and 14c. Some parts that can be found in other drawings have been left out to simplify presentation.

Further, each of the gear cartridges have a number of similar components that are re-used for the gear ranges. E.g., in FIGS. 3a, and 3b, the outer ring (103), the main shaft (5) and the first and second inner, middle and outer clutch elements (351, 352, 353, 451, 452, 453) are identical.

The first and second outward clutch elements (71, 72) are also identical in this case, since the first housing (170) is identical for the three gear systems. However, if the cartridges are arranged in other housings, such as e.g., in a crank drive with an electric motor, the first and second outward clutch elements could be adapted for that specific application.

Each of the gear systems comprises a planetary gear section (10) with an input, in this case the first outward clutch element (71) and an output, in this case the second outward clutch element (72).

The structure of the planetary gear section (10) is common for all gear systems, where the planetary gear section (10) is arranged coaxially on the main shaft (5), wherein the planetary gear section comprises a first and second interconnected planetary gear sets (11, 12), and wherein the first planetary gear set (11) comprises a first sun gear (111), first planetary gears (112), and a first ring gear (113), and the second planetary gear set (12) comprises a second sun gear (121), second planetary gears (122), and a second ring gear (123).

The multi-speed gear system (1) further comprises first and second clutch sets (35, 45) arranged on respective sides of the planetary gear set (10), wherein the first clutch set (35) comprises a first outward clutch element (71) and radially stacked, axially movable first inner, middle and outer clutch elements (351, 352, 353), and the second clutch set (45) comprises a second outward clutch element (72) and radially stacked, axially movable second inner, middle and outer clutch elements (451, 452, 453).

The planetary gear section (10) comprises also first second and outer carriers (101, 102, 103).

The first carrier (101) holds the second planetary gears (122), wherein a first end (101a) is releasably connected to the first inner clutch element (351) and a second end (101b), opposite the first end is releasably connected to the second inner clutch element (451). The first sun gear (111) is arranged rotationally fixed to the first carrier (101) between the first end (101a) and the second planetary gears (122), and an inner diameter of the first sun gear (111) is larger than an outer diameter of the first end (101a).

The second sun gear (121) is arranged rotationally fixed on the main shaft (5) and an inner diameter of the second end (101b) is larger than an outer diameter of the second sun gear (121).

The second carrier (102) holds the first planetary gears (112), wherein a wherein a first end (102a) is releasably connected to the first middle clutch element (352) and a second end (102b), opposite the first end is releasably connected to the second middle clutch element (452), wherein the second ring gear (123) is arranged rotationally fixed to the second carrier (102) between the second end (102b) and the second planetary gears (122), and wherein an inner diameter of the second end (102b) is larger than an outer diameter of the second ring gear (123).

A first end of the outer ring (103) is releasably connected to the first outer clutch element (353) and a second end (103b), opposite the first end is releasably connected to the second outer clutch element (453), wherein the first ring gear (113) is arranged rotationally fixed to the outer ring (103) between the first end and the second planetary gear set (12), and wherein the first end (102a) of the second carrier (102) is smaller than the inner diameter of the first ring gear (113).

For the first gear system, the first planet gears (112) are identical to the second planet gears (122) both in size and number of teeth.

For the second gear system, the first planet gears (112) are identical to the first planet gears of the first gear system.

As explained above, the inner clutch elements are the same for all three gear systems. In addition they are symmetrical, such that the first and second inner clutch elements (351, 451) are identical and symmetrically arranged about the planetary gear section (10) for all three gear systems.

Similarly, the first and second middle clutch elements (351, 451) are identical and symmetrically arranged about the planetary gear section (10) for all three gear systems.

And finally, the first and second outer clutch elements (351, 451) are identical and symmetrically arranged about the planetary gear section (10) for all three gear systems.

The first and second clutch sets (35, 45) comprises first and second static and dynamic shift rings (331, 431, 341, 441), and one or more shift balls (312, 412), respectively, wherein the shift balls are configured to move radially and to abut inclined surfaces of a pair of first and second static and dynamic shift rings (331, 431, 341, 441) to axially move the dynamic shift rings (341, 441) inwardly towards the planetary gear section (10) when extending radially.

The first clutch set (35) is configured to sequentially release the first inner and middle clutch elements (351, 352) when the first dynamic shift ring (341) moves inwardly and the second clutch set (45) is configured to sequentially release the outer and middle clutch elements (453, 452) when the second dynamic shift ring (441) moves inwardly. In order to operate the second clutch set (45) from outer to middle, a thrust disk (411) is used.

The following table below summarizes the relevant parameters for this embodiment for the three cartridges (15a, 15b, 15c) or three gear systems (1a, 1b, 1c).

| Range % | 428 (15a, 1a) | 377 (15b, 1b) | 326 (15c, 1c) |
|---|---|---|---|
| Interval % | 27 | 24 | 21 |
| First sun gear (111) # teeth | 69 | 69 | 66 |
| First ring gear (113) # teeth | 99 | 99 | 99 |
| Second sun gear (121) # teeth | 51 | 45 | 44 |
| Second ring gear (123) # teeth | 81 | 81 | 91 |

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. A system comprising:
a plurality of multi-speed gear cartridges with different gear ranges, the plurality of multi-speed gear cartridges comprising first and second gear cartridges, each of the gear cartridges comprising:
a main shaft, and
a planetary gear section comprising:
a first planetary gear set comprising
a first sun gear,
first planetary gears, and
a first ring gear,
a second planetary gear set interconnected with the first planetary gear set, the second planetary gear set comprising
a second sun gear arranged rotationally fixed to the main shaft,
second planetary gears, and
a second ring gear,
a first carrier holding the second planetary gears and the first sun gear,
a second carrier holding the first planetary gears and the second ring gear,
an outer carrier holding the first ring gear, and
first and second clutch sets disposed on respective sides of the planetary gear section,
wherein the teeth ratio between the first sun gear and the first ring gear is identical in the first and second gear cartridges and the second ring gears are identical in the first and second gear cartridges.

2. The system according to claim 1, wherein the teeth ratio between the first sun gear and the first ring gear is in a range of 0.60-0.80 in the first and second gear cartridges.

3. The system according to claim 1, wherein the teeth ratio between the second sun gear and the second ring gear is in a range of 0.53-0.73 in the first gear cartridge and in a range of 0.45-0.65 in the second gear cartridge.

4. The system according to claim 1, wherein the multi-speed gear cartridges further comprise a third gear cartridge with a gear range different from the gear ranges of the first and second gear cartridges,
    wherein the first ring gear in the third gear cartridge is identical to the first ring gears in the first and second gear cartridges.

5. The system according to claim 4, wherein the teeth ratio between the first sun gear and the first ring gear is in a range of 0.57-0.77 in the third gear cartridge.

6. The system according to claim 4, wherein the teeth ratio between the second sun gear and the second ring gear is in a range of 0.38-0.58 in the third gear cartridge.

7. The system according to claim 2, wherein the multi-speed gear cartridges further comprise a third gear cartridge with a gear range different from the gear ranges of the first and second gear cartridges,
    wherein the first ring gear of the third gear cartridge is identical to the first ring gears of the first and second gear cartridges.

8. The system according to claim 7, wherein one or more of: (i) outer rings comprising the planetary gear section and the first and second clutch sets, and (ii) the main shaft of any of the first, second, and third gear cartridges are identical.

9. The system according to claim 1, wherein the multi-speed gear cartridges are configured to be disposed inside housings of a pedally propelled vehicle.

10. The system according to claim 7, wherein the first clutch set comprises a first outward clutch element and radially stacked, axially movable first inner, middle, and outer clutch elements, and
    the second clutch set comprises a second outward clutch element and radially stacked, axially movable second inner, middle, and outer clutch elements, and
    wherein the first and second inner clutch elements of any of the first, second, and third gear cartridges are identical and symmetrically arranged about the planetary gear section.

11. The system according to claim 10, wherein the first and second middle clutch elements of any of the first, second, and third gear cartridges are identical and symmetrically disposed about the planetary gear section.

12. The system according to claim 7, wherein the second sun gear is configured to be slidingly disposed on the main shaft and axially supported by a support protrusion in a direction for any of the first, second, and third gear cartridges.

* * * * *